(12) United States Patent
Ishida et al.

(10) Patent No.: US 7,864,812 B2
(45) Date of Patent: Jan. 4, 2011

(54) DIGITAL BROADCAST MULTIPLEXING APPARATUS

(75) Inventors: Takaharu Ishida, Hitachinaka (JP); Osamu Tomobe, Mito (JP)

(73) Assignee: Hitachi, Ltd., Tokyo (JP)

( * ) Notice: Subject to any disclaimer, the term of this patent is extended or adjusted under 35 U.S.C. 154(b) by 128 days.

(21) Appl. No.: 12/388,836

(22) Filed: Feb. 19, 2009

(65) Prior Publication Data

US 2009/0232165 A1  Sep. 17, 2009

(30) Foreign Application Priority Data

Mar. 14, 2008  (JP) .............................. 2008-065075

(51) Int. Cl.
  H04J 3/06 (2006.01)
  H04J 3/04 (2006.01)
  H04L 12/26 (2006.01)
(52) U.S. Cl. .................... 370/503; 370/535; 370/252
(58) Field of Classification Search ................ 370/503, 370/535–536, 474, 537–538, 252; 714/746, 714/776
  See application file for complete search history.

(56) References Cited

U.S. PATENT DOCUMENTS

| 6,414,970 B1 * | 7/2002 | Negishi et al. ............... 370/510 |
| 6,738,393 B2 * | 5/2004 | Miki et al. .................. 370/506 |
| 7,039,070 B2 * | 5/2006 | Kawakatsu ................. 370/503 |
| 7,099,279 B2 * | 8/2006 | Murayama et al. ........... 370/252 |
| 7,120,169 B2 * | 10/2006 | Wolf et al. .................. 370/503 |
| 2006/0029139 A1 * | 2/2006 | Teichner et al. ........ 375/240.28 |
| 2007/0217452 A1 * | 9/2007 | Kato ........................... 370/503 |
| 2010/0118207 A1 * | 5/2010 | Yun et al. .................... 348/723 |

FOREIGN PATENT DOCUMENTS

| JP | 2001-028738 | 1/2001 |
| JP | 2001-257654 | 9/2001 |
| JP | 2003-101976 | 4/2003 |
| JP | 2005-277464 | 10/2005 |

* cited by examiner

*Primary Examiner*—Kwang B Yao
*Assistant Examiner*—Candal Elpenord
(74) *Attorney, Agent, or Firm*—Antonelli, Terry, Stout & Kraus, LLP.

(57) ABSTRACT

In a digital broadcast multiplexing apparatus for multiplexing a plurality of programs on a single physical channel so as to broadcast the digital multiplexed broadcasting program, there are provided with an apparatus for correcting positions of PCR packets contained in transport streams within the respective programs, and a PCR correction value forming apparatus for applying values of correcting PCR values with respect to a result of the position corrections in order to simply execute a function capable of uniformly synchronizing the PCR packets contained in the transport streams and capable of viewing the received programs without any interruption on the reception side even when a tuning operation is carried out. Then, the digital broadcast multiplexing apparatus outputs such a broadcast program packet stream which has been multiplexed as a single broadcast program in such a manner that the PCR packets are synchronized with each other among the plurality of programs.

4 Claims, 8 Drawing Sheets

FIG. 8

| BIT ALLOCATION | CONTENT | |
|---|---|---|
| B0~B19 | — | |
| B20~B21 | SYSTEM IDENTIFICATION | |
| B22~B25 | TRANSMISSION PARAMETER SWITCHING INDEX | |
| B26 | URGENT ALARM BROADCAST-PURPOSE INITIATION FLAG | |
| B27 | CURRENT INFORMATION | PARTIAL RECEPTION FLAG |
| B28~B40 | | A-LAYER TRANSMISSION PARAMETER INFORMATION |
| B41~B53 | | B-LAYER TRANSMISSION PARAMETER INFORMATION |
| B54~B66 | | C-LAYER TRANSMISSION PARAMETER INFORMATION |
| B67 | NEXT INFORMATION | PARTIAL RECEPTION FLAG |
| B68~B80 | | A-LAYER TRANSMISSION PARAMETER INFORMATION |
| B81~B93 | | B-LAYER TRANSMISSION PARAMETER INFORMATION |
| B94~B106 | | C-LAYER TRANSMISSION PARAMETER INFORMATION |
| B107~B119 | CONNECTED ONE-SEG RE-TRANSMISSION PHASE CORRECTION AMOUNT | |
| B120~B121 | RESERVE | |

DIGITAL BROADCAST MULTIPLEXING APPARATUS

BACKGROUND OF THE INVENTION

The present invention is related to a digital broadcast multiplexing and sending apparatus designed for mobile appliances.

As to synchronizing methods for a plurality of streams, the below-mentioned techniques are known.

JP-A-2005-277464 has disclosed such a broadcast material signal switching apparatus that while a broadcast material signal transmitted from a mother station is switched to a broadcast material signal of a net-receiving station, a net queue detector detects a net queue signal contained in the broadcast material signal transmitted from the mother station; and since switching precision of a selection switch is increased, the switching operation between the broadcast material signals is performed in a smooth manner, while partial viewing of the broadcast material from the mother station is not produced in the transmitted signal.

In another conventional technique described in JP-A-2001-257654, in order that an STC (System Time Clock) value measured by a switching device is synchronized with an STC value measured by an encoder when a system is switched, a synchronous generation controller notifies a reference STC value to the switching device and the encoder respectively by utilizing an ancillary signal packet contained in an SDI (Serial Digital Interface) signal. Then, the encoder which has received the SDI signal performs compressing/encoding operations with respect to a picture signal in such a manner that frame phases between the systems are matched with each other based upon this reception result so as to convert the compressed/encoded picture signal into a bit stream, and also, extracts the reference STC value from the ancillary signal packet of the SDI signal. Then, the encoder replaces measurement STC values measured at the respective STCs by reference STC values, and adds the reference STC value to each frame of the bit stream to be transmitted. Also, the switching device which has received the SDI signal switches the systems based upon the reference STC values extracted from the ancillary signal packet.

JP-A-2003-101976 has realized such a stream producing apparatus capable of accepting a change in program numbers in a flexible manner by employing a temporal information correcting unit. The temporal information correcting unit calculates a correction value equivalent to such a time required in a signal processing operation by a signal processing unit, and then, corrects a value of a PCR (Program Clock Reference) contained in a stream which is changed during the signal processing operation.

Also, JP-A-2001-28738 has disclosed such a synchronizing method for synchronizing streams with each other by employing an externally-generated reference clock.

SUMMARY OF THE INVENTION

Among the above-described conventional techniques, the conventional technical idea disclosed in JP-A-2005-277464 has the following problem. That is, the appearance intervals of the PCR packets as to the stream to be replaced and the replacing stream are not temporally synchronized with each other. As a result, in such a case that appearance intervals of PCR packets are relatively long, as realized in a 1-segment broadcasting system based upon the ISDB-T method, when the PCR packets are decoded in a terminal, there are some possibilities that a so-called "partial viewing" phenomenon may still occur due to the positional shifts of the PCR packets. Also, the conventional technical idea disclosed in JP-A-2001-257654 has the following problem. That is, although the reference time instants are corrected among the plurality of streams based upon the STC value, in such a case that the appearance time period of the PCR packets are relatively long, there are some possibilities that such a time lag may be produced which is two times longer than the appearance time period of the maximum PCR packet. Furthermore, the conventional technical idea disclosed in JP-A-2003-101976 has problems which are similar to those of the previously-explained two conventional technical ideas.

In a digital broadcasting system, when channels are switched while a certain channel is viewed, the below-mentioned channel transition necessarily occurs. That is, the channel which has been selected is transferred to a newly-selected channel via such a status that a viewing screen is once brought into a so-called "black out" status, or the viewing screen is frozen (namely, freezing status). This status is caused by that PCR packets are not synchronized with each other among broadcast stations which broadcast the respective channels. In other words, when a tuning operation is carried out, values of PCR (Program Clock Reference) contained in program data of the respective broadcast stations are discontinuities, and thus, a decoder is once reset, so that the decoder discards such a data which has already been decoded. As a result, this condition may become equivalent to such a status that a storage content of a buffer of the decoder is once cleared, so that a display screen is brought into a so-called "black out" status, or a screen freezing status until necessary data may be stored in the buffer of the decoder. Thereafter, the tuned program may be displayed after the decoded data has been stored in this buffer. This waiting time after the channel selection constitutes such a phenomenon which never occurs in an analog broadcast system, and may give an unpleasant viewing effect to viewers.

On the other hand, as new future broadcasting systems, such a broadcasting system has be gently popularized that programs being broadcasted every 1 segment are combined with each other to form a single channel. For instance, a broadcasting system designed for a broad area corresponds to the above-explained new future broadcasting systems, in which segments for transmitting a plurality of different programs are coupled with each other on a single channel in the form of the connected One-Seg re-transmission. In the case of this broadcasting system, transport streams of a digital broadcast which have been independently encoded in a single segment are directly re-multiplexed with each other on 1 channel. As a result, when the transport streams are re-multiplexed with each other, PCR packets are not synchronized with each other. As a consequence, when programs are switched by executing a tuning operation among the respective segments, a so-called "black out" phenomenon and a screen freezing phenomenon still occur on the side of a receiving terminal.

Also, when a tuning operation is carried out on the reception side, in order that the tuned program can be viewed without any interruption on the reception side, PCR packets contained in transport streams of each of the programs must be uniformly synchronized with each other. To this end, for instance, JP-A-2001-28738 has disclosed the following technical ideas: That is, in "reference clock" shown in FIG. 1, an expensive rubidium oscillator capable of generating a synchronization signal is employed, or a line for transferring the synchronization signal is employed. However, these apparatuses have a problem of higher setting cost. Under such a circumstance, a simple method and a synchronous multiplexing system capable of multiplexing a plurality of programs with each other have been expected, while time synchronization may be carried out by maintaining practical precision.

The present invention has been made to solve the above-described problems, and therefore, has an object to provide a digital broadcast multiplexing apparatus equipped with a PCR position detecting apparatus and a PCR correction value forming apparatus, while the PCR position detecting apparatus and the PCR correction value forming apparatus select such a transport stream which is employed as a reference from a plurality of transport streams to be multiplexed with each other, and then, a PCR packet contained in the selected transport stream is analyzed. The digital broadcast multiplexing apparatus is further equipped with a PCR position correcting apparatus which performs a multiplexing time correction for packets to be multiplexed in accordance with the analysis result of the PCR position detecting apparatus. This PCR position correcting apparatus corrects PCR packets contained in respective transport streams except for the above-selected transport stream which is employed as the reference, and performs a time synchronization of PCR packet transmission timing among the plural transport streams. In an REMUX apparatus of the digital broadcast multiplexing apparatus, values of PCRs are corrected which correspond to the respective transport streams corrected by the PCR correction value forming apparatus, and then, the plural transport streams are re-multiplexed with each other.

Since the multiplexing system of the present invention is employed, the PCR packets among the respective segments can be synchronized with each other. As a consequence, even when a segment tuned within the segments of the channel is moved, occurrence frequencies as to the so-called "black out" phenomenon and the screen freezing phenomenon may be reduced when the tuning operation is carried out.

In such a case that a plurality of broadcasting programs are multiplexed with each other and then the multiplexed broadcasting programs are broadcasted as one channel, when broadcasting programs are switched within one channel, such a broadcasting program that program transitions can be smoothly made without interruption can be produced.

Other objects, features and advantages of the invention will become apparent from the following description of the embodiments of the invention taken in conjunction with the accompanying drawings.

BRIEF DESCRIPTION OF THE DRAWINGS

FIG. 8 is an explanatory diagram for explaining TMCC information of the digital broadcast multiplexing apparatus.

DETAILED DESCRIPTION OF THE INVENTION

Referring now to drawings, a description is made of various embodiments of digital broadcast multiplexing apparatuses according to the present invention.

First Embodiment

Figure 1:
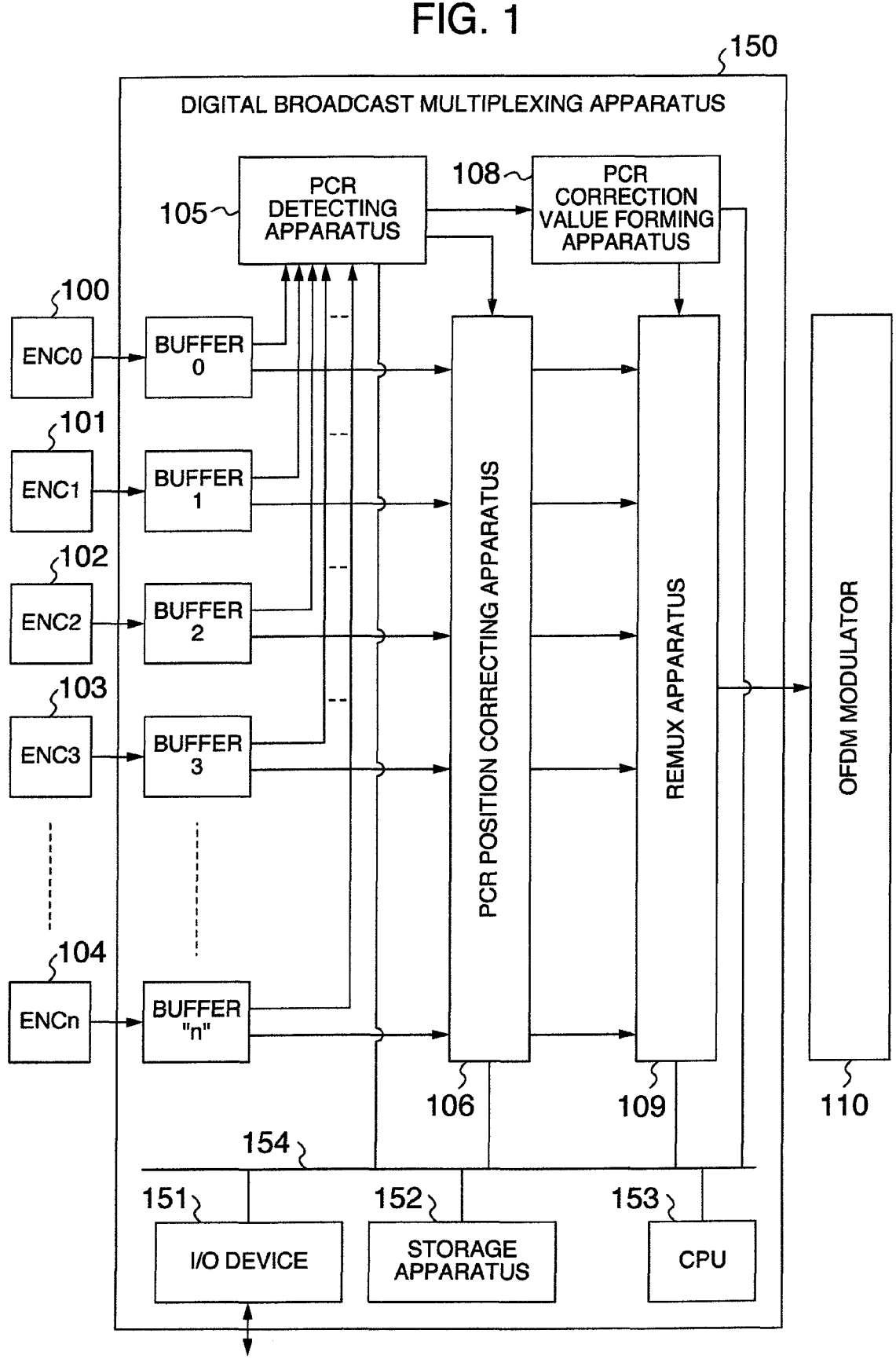
FIG. 1 is a block diagram for schematically showing an arrangement of a digital broadcast multiplexing apparatus according to a first embodiment of the present invention.

A digital broadcast multiplexing apparatus 150 shown in FIG. 1, according to a first embodiment of the present invention, inputs thereinto transport streams (TSs) which are outputted from signal generating apparatuses 100 to 104 (ENC0, ENC1, ENC2, ENC3, - - - , ENCn), and outputs an ISDB-T transport stream to an OFDM modulator 110. This digital broadcast multiplexing apparatus 150 has been equipped with a PCR detecting apparatus 105, a PCR position correcting apparatus 106, a PCR correction value forming apparatus 108, an REMUX apparatus 109, an I/O device 151, a storage apparatus 152, and a CPU 153. The REMUX apparatus 109 multiplexes the transport streams with each other, which are outputted from the signal generating apparatuses 100 to 104. The I/O device 151 transmits/receives a signal from an input device such as a keyboard, and a control signal using RS422. The storage apparatus 152 stores thereinto various sorts of setting information such as, as beginning information, setting values in case of REMUX. The PCR detecting apparatus 105, the PCR position correcting apparatus 106, the PCR correction value forming apparatus 108, and the REMUX apparatus 109 have been connected via a bus 154 to the I/O device 151, the storage apparatus 152, and the CPU 153.

Data are inputted/outputted in the form of transport streams between the PCR detecting apparatus 105 and respective buffers which correspond to the signal generating apparatuses 100 to 104; between the PCR position correcting apparatus 106 and the respective buffers; between the PCR detecting apparatus 105 and the PCR position correcting apparatus 106; and between the PCR position correcting apparatus 106 and the REMUX apparatus 109. PCR packets are transmitted/received between the PCR detecting apparatus 105 and the PCR correction value forming apparatus 108. PCR packets are transmitted/received between the PCR correction value forming apparatus 108 and the REMUX apparatus 109, whereas data are transmitted/received in the form of ISDB-T transport streams between the REMUX apparatus 109 and the OFDM modulator 110.

The signal generating apparatuses 100 to 104 are such apparatuses which generate transport streams, and are typically known as encoders which encode broadcast data such as pictures, sounds, and the like. In this embodiment, while the transport streams are such data on which pictures, sounds, data, and system information have been multiplexed, it is necessarily required that minimum numbers of data (system information typically known as, for example, PSI/SI) which is required in digital broadcasting, and also, time control information (PCR etc.) have been multiplexed on the transport streams. As previously described, the signal generating apparatuses 100 to 104 themselves may be realized by apparatuses which merely transmit the transport streams, or may be alternatively realized by relay appliances which relay the transport streams in addition to the apparatuses which encode the pictures and the sounds in real time.

In the below-mentioned descriptions, in the digital broadcast multiplexing apparatus 150, it is so assumed that the transport streams entered from the signal generating apparatuses 100 to 104 have been allocated to layers constituted by one, or more pieces of OFDM segments (will be referred to as "segments" hereinafter) after TS packets suitable for OFDM modulations have been arranged by the REMUX apparatus 109. In the present embodiment, in particular, a description will be made of such an assumption that each of the layers is arranged by 1 segment. However, one layer may be alternatively arranged by a plurality of segments.

Next, a description is made of respective apparatuses which constitute the digital broadcast multiplexing apparatus 150. The PCR detecting apparatus 105 selects one transport stream (namely, reference stream) from the transport streams transmitted from the plurality of signal generating apparatuses 100 to 104, while the selected single transport stream is employed as a reference of a time instant. Also, as to the plurality of inputted transport streams, the PCR detecting apparatus 105 detects positions of PCR packets which have been multiplexed in the respective transport streams. As to the selection of one transport steam used as the reference of the time instant, the PCR detecting apparatus 105 determines this single transport stream based upon such a selection base for selecting the smallmost ID number among ID numbers applied to a plurality of signal generating apparatuses present in a system, or for selecting the smallmost PCR value at certain temporal sections. In the below-mentioned explanations, it is so assumed that a transport stream transmitted from the signal generating apparatus ENC0 corresponds to the selected transport stream.

In such a case that the transport streams are not synchronized with each other by employing an external clock, since the multiplexed positions of the PCR packets in the transport streams have been shifted in the respective transport streams, there are some possibilities that an arrival time instant of a PCR packet in a transport stream transmitted from each of the signal generating apparatuses 100 to 104 may be shifted by a time period equivalent to the maximum PCR time period, and thus, such a phenomenon may occur that the multiplexed positions of the PCR packets of the respective transport streams are shifted from each other by this arrival time instant. When a transport stream to be reproduced is transferred among these transport streams by a tuning operation, a receiver newly acquires PCR in a transport stream as the transfer destination so as to perform a reproducing control of a stream. As a result, resetting of a decoder may occur every time the reproducing control of the stream is carried out. In other words, probability may increase at which disturbances of reproduced images occur, which is similar to a black out phenomenon and a picture disturbance phenomenon when a channel is selected in the presently available digital broadcast.

Also, even when only timing as to multiplexed positions of PCR packets is made coincident with each other among the transport streams transmitted from the respective signal generating apparatuses 100 to 104, if PCR values stored in the PCR packets of the respective transport streams at the same multiplexed positions are not equal to each other, then the above-described black out and screen disturbance phenomenon may occur. As a consequence, even in such a case that transport streams to be reproduced are transferred among such transport streams that only the timing as to the multiplexed positions of the PCR packets has been made coincident with each other, in order to avoid the occurrences of the black out and the screen disturbance phenomenon, such PCR packets having similar PCR values must be multiplexed at similar timing with respect to all of the multiplexed transport streams. To this end, in the digital broadcast multiplexing apparatus 150 according to the first embodiment, PCR corrections are performed in two stages. That is, as a first stage, positions of PCR packets contained in transport streams are corrected in order that transmission timing of the PCR packets to the REMUX apparatus 109 within the respective transport streams is matched with each other within a predetermined allowable range. Thereafter, the PCR values themselves are corrected.

Figure 2:
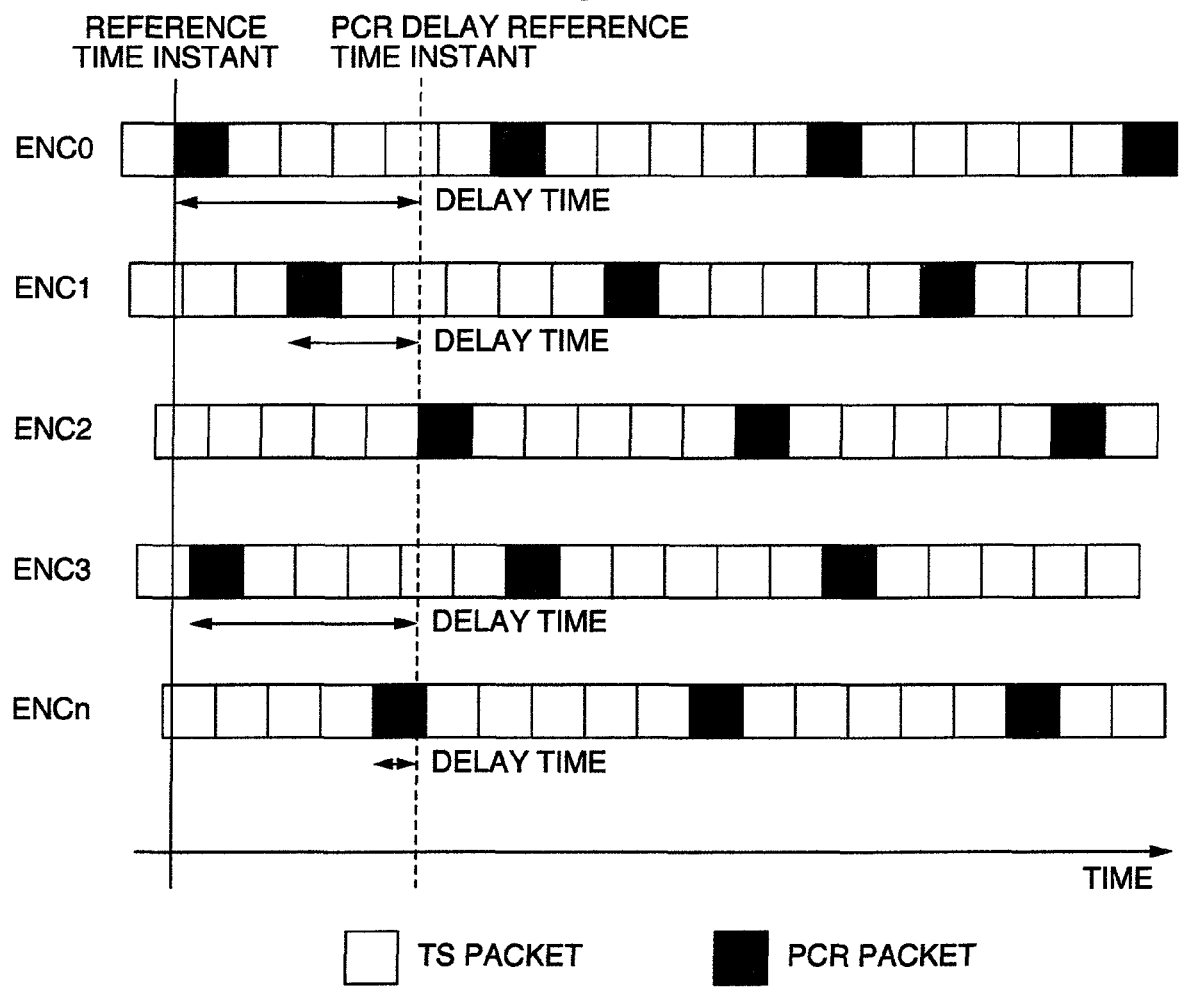
FIG. 2 is a diagram for showing PCR inserted positions by the digital broadcast multiplexing apparatus indicated in FIG. 1.
Figure 3:
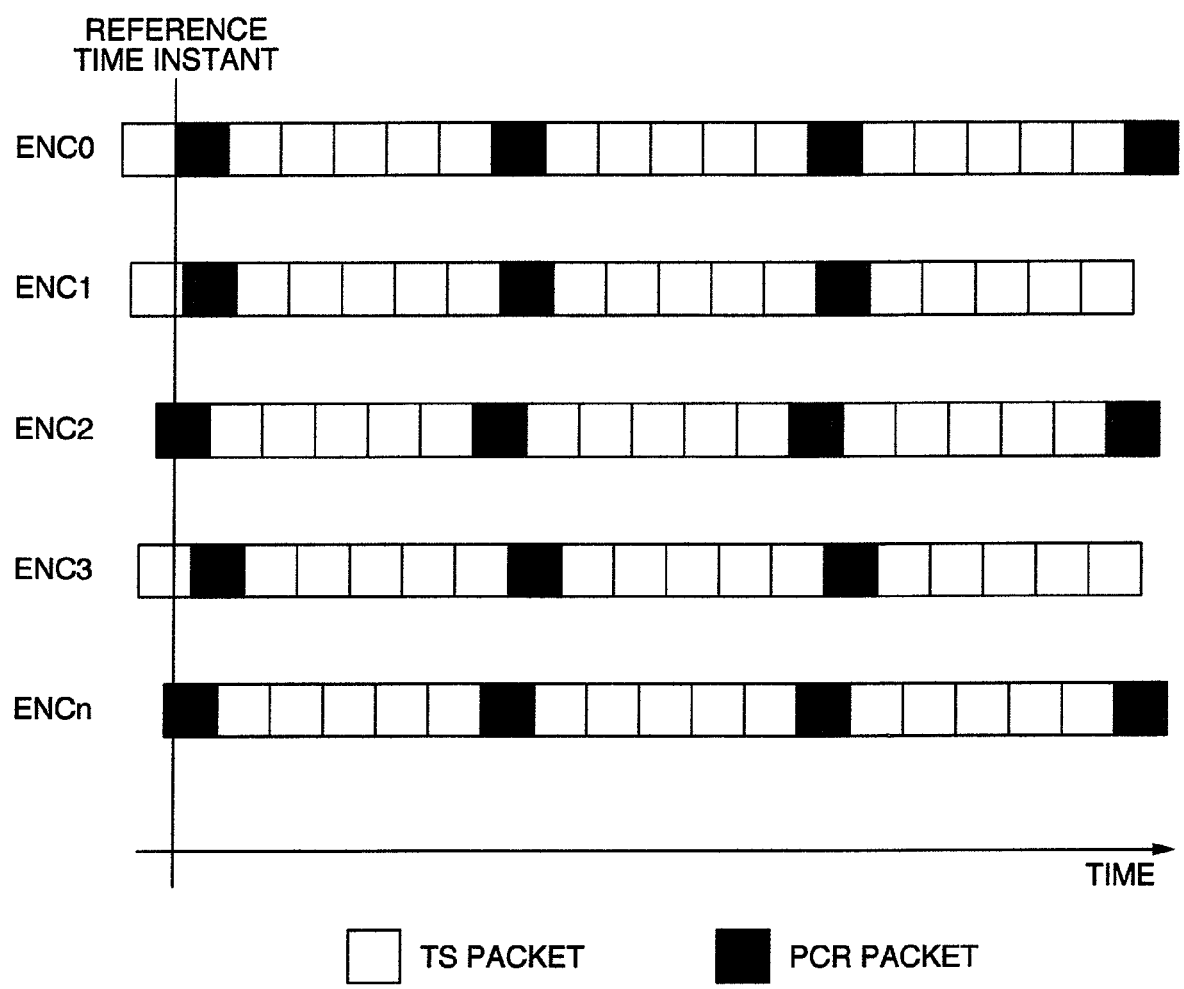
FIG. 3 is a diagram for representing a matching result obtained by matching PCR positions with each other by the broadcast multiplexing apparatus.

A description is made of PCR position correcting operations by the PCR position correcting apparatus 106 with reference to FIG. 2 and FIG. 3. FIG. 2 is a diagram for schematically representing transport streams which are to be multiplexed and are transmitted from the signal generating apparatuses 100 to 104. In this drawing, symbol "white rectangle" indicates a normal transport stream packet (TS packet), and symbol "black rectangle" indicates a PCR packet. In the case that a plurality of transport streams have not been multiplexed with each other, as represented in FIG. 2, since time instants as to the respective transport streams are not originally synchronized with each other, when a reference time instant is set at an arbitrary time, heads of packets contained in other transport streams are not always made coincident with the above-described reference time instant. For example, as indicated in FIG. 2, in such a case that the reference time instant has been set at a head of a PCR packet contained in a transport steam of the signal generating apparatus ENC0 which is employed as a reference of a time instant, as to other transport streams, heads of packets thereof are not always made coincident with this reference time instant. For instance, heads of TS packets and heads of PCR packets of the signal generating apparatuses ENC1 to ENCn are not always made coincident with this reference time instant.

Then, even if the respective signal generating apparatuses 100 to 104 obey insertion time periods of PCR packets in accordance with the operating regulations of Association of Radio Industries and Businesses "ARIB", it is conceivable that the probability is low at which multiplexed positions of the PCR packets are made coincident with each other in all of transport streams due to setting of the respective signal generating apparatuses 100 to 104, and initiation timing thereof.

As a consequence, the PCR position correcting apparatus 106 corrects positions of the PCR packets in such a manner that although positional shifts of the PCR packets are present with respect to the reference time instant, the multiplexed positions of the PCR packets contained in the transport streams are synchronized with each other among the respective transport streams within a predetermined range (refer to FIG. 3).

A problem may occur when temporal positions of PCR packets are synchronized with each other, namely, a jitter may occur which corresponds to an index indicative of an arrival shift of a PCR value, as viewed from the reference time instant. A jitter of a PCR value has been defined within 500 (ns) in the operating regulations of the ARIB. As a consequence, in order that the arrangement of the PCR packets contained in the respective transport streams under such a status shown in FIG. 2 is changed into another status indicated in FIG. 3 so as to minimize jitters, the PCR position correcting apparatus 106 delays such timing that packets are derived within the buffers provided for the respective transport steams and the derived packets are transmitted to the REMUX apparatus 109, so that the PCR position correcting apparatus 106 corrects inserting positions of the PCR packets when the re-multiplexing operation is carried out. To this end, the PCR position correcting apparatus 106 evaluates a position of a PCR packet contained in a transport stream which is employed as a reference, and positions of PCR packets contained in other transport streams based upon a reference defined by the below-mentioned formula 1.

500 (ns)>|PCRtime (base)−PCRtime (n)|   (formula 1)

Where,
PCRtime (base): PCR value of transport stream which is employed as reference; and
PCRtime (n): PCR value of transport stream "n".
In this formula 1, the above-described PCR value implies a value of a PCR time instant stored in a PCR packet.

After the evaluation has been carried out based upon this formula 1, if the above-explained condition cannot be satisfied, the PCR position correcting apparatus 106 calculates a position of such a PCR packet capable of minimizing the jitter. In such a case that the condition defined by the formula 1 can be satisfied, the PCR position correcting apparatus 106 maintains the multiplexed position of the PCR packet originally generated from the relevant signal generating apparatus.

It should also be understood that in the example of FIG. 2, such a case has been described that the time periods during which the PCR packets have been inserted are equal to each other in the transport streams of the ENC0 to the ENCn. In the case where insertion time periods of the PCR packets are different from each other among these transport streams, the PCR packet positions are corrected within a time period which constitutes the greatest common divisor (G.C.D.) of the PCR packet insertion time periods in the respective TSs.

Figure 4:
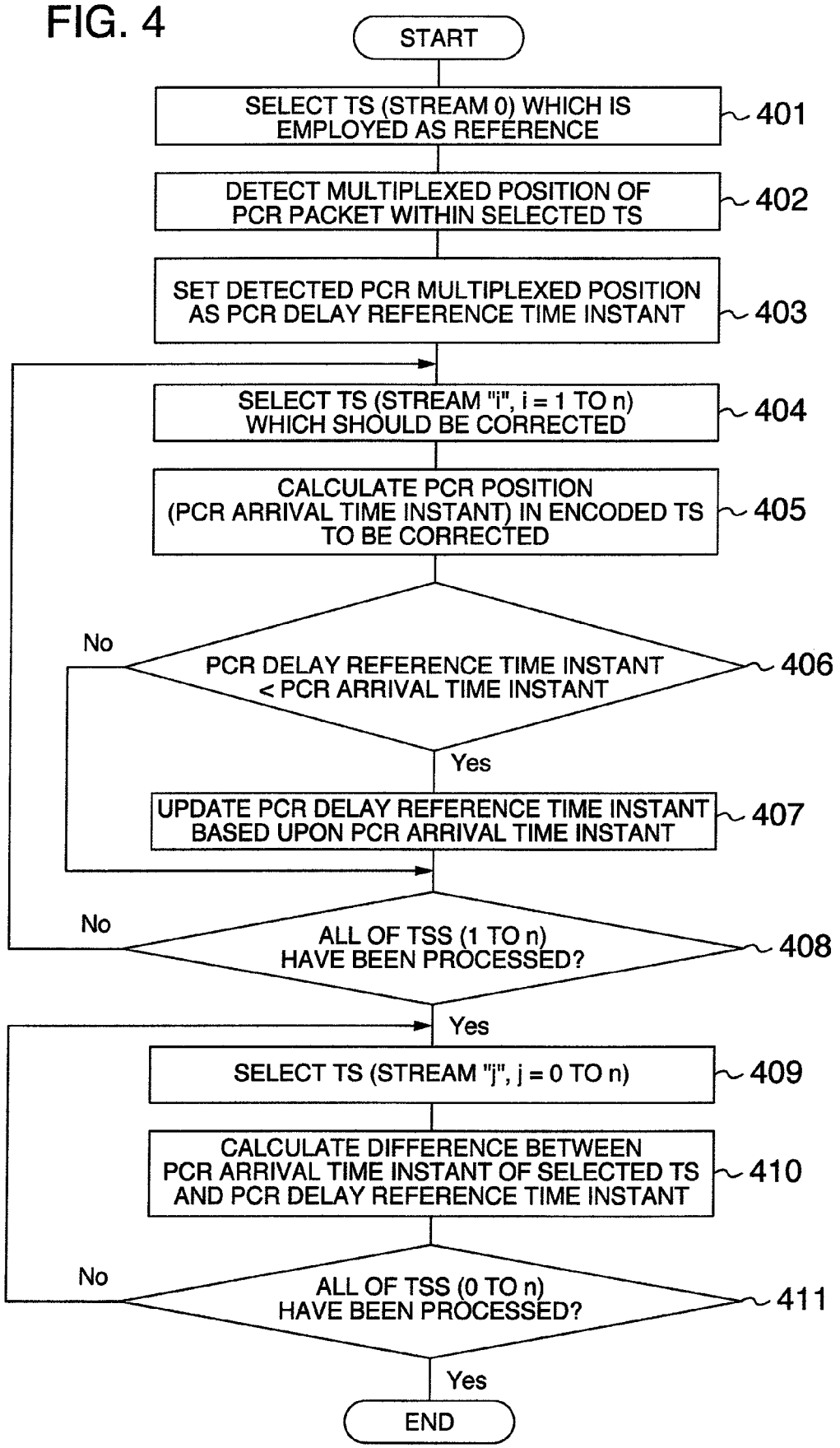
FIG. 4 is a flow chart for describing a PCR position correcting process operation executed by the digital broadcast multiplexing apparatus.

A description is made of a process operation for correcting the above-described PCP packet positions with reference to FIG. 4. It should also be noted that in the process operation of FIG. 4, this correcting process operation is performed based upon the below-mentioned assumption. That is, in this assumption, PCR packets contained in all of transport streams except for the transport stream which is employed as the reference cannot satisfy the condition defined by the above-described formula 1. However, in such a case that a transport stream which can satisfy the condition of the formula 1 is present, only such process operations defined from a processing step 409 until a processing step 411 may be merely carried out with respect to this transport stream.

In a processing step 401, a transport stream which is employed as the reference is selected by the PCR detecting apparatus 105. It is so assumed that this selected transport stream is a stream "0" in the below-mentioned descriptions. As previously explained, a bases for selecting such a transport stream is given as follows: That is, a PCR packet having a minimum PCR value may be selected; a transport stream having a PCR packet whose arrival time instant is the shortest arrival time instant may be alternatively selected; and other selection bases may be conceived. Next, in a processing step 402, a multiplexed position of a PCR packet contained in the transport stream selected in the processing step 401 is detected by the PCR detecting apparatus 105. In this multiplexed position detection, an absolute time instant is detected at which the PCR packet has been multiplexed. The multiplexed position of the PCR packet, namely, an arrival time instant of this PCR packet in the digital broadcast multiplexing apparatus 150, may be grasped based upon a clock signal of the CPU 153 when a packet of such a transport stream having a specific PID (PID of PCR) is entered into a buffer of such a transport stream which constitutes a detection subject with respect to the respective buffers provided for each of the transport streams. Then, in a processing step 403, the multiplexed position of the PCR packet detected in the transport stream which is employed as the reference, namely, the arrival time instant of this PCR packet is defined as an initial value of a reference time instant (PCR delay reference time instant) when such a time is delayed during which a packet is derived from a buffer and the derived packet is transmitted to the REMUX apparatus 109.

Next, while the absolute time instant of the arrived PCR packet contained in the transport stream selected in the processing step 401 is employed as the reference (ENC0 will be employed as reference in the below-mentioned description), correcting operations as to positions of PCR packets contained in other transport streams are carried out. As a concrete correcting method, the above-described arrival absolute time instant of the first PCR packet contained in the transport stream which is employed as the reference is compared with an arrival time instant of a PCR packet which has arrived at first within the transport streams whose PCR positions should be corrected, and then, a delay time for packet transmission timing is calculated as the value for shifting the PCR packet arrival time instant whose PCR position should be corrected within the buffer (refer to FIG. 2).

Firstly, in a processing step 404, a selection is made of one transport stream which should be processed in a PCR packet position changing operation and a PCR value changing operation for the PCR correction from such transport streams which have not yet been processed. In this case, PIDs of PCR packets outputted from the respective signal generating apparatuses 100 to 104 are changed, so that a PCR packet of a specific transport stream can be discriminated from other PCR packets. Also, a corresponding relationship between the transport streams and the PIDs of the PCR packets may be alternatively stored in the storage apparatus 152. In a processing step 405, an arrival time instant of the PCR packet is detected which corresponds to the multiplexed position of the PCR packet of such a transport stream which has been selected as the subject transport stream in which the position of the PCR packet is corrected. In a processing step 406, the detected PCR arrival time instant is compared with the PCR delay reference time instant, and then, if the PCR arrival time instant retards with respect to the PCR delay reference time instant, then the PCR delay reference time instant is updated based upon this PCR arrival time instant (processing step 407). Then, the CPU 153 checks whether or not process operations have been accomplished as to all of transport streams which should be processed (processing step 408). If the process operations have been accomplished, then the process operation is advanced to a next processing step 409, whereas if the process operations have not yet been accomplished, then the process operation is returned to the previous processing step 404. Since the previously explained process operations have been executed, an arrival time instant of such a PCR packet may be acquired as the PCR delay reference time instant, while this PCR packet has arrived at the latest time instant from the PCR arrival time instant of the transport stream which is employed as the reference.

Subsequently, in a processing step 409, one transport stream is selected from all of the transport streams entered from the signal generating apparatuses 100 to 104. Then, in a processing step 410, as to the selected transport stream, a difference between the PCR arrival time instant and the PCR delay reference time instant, which have been calculated in the processing step 405, is calculated as a delay time for transmitting a packet in this selected transport stream. The calculated delay time is stored in the storage apparatus 152 in correspondence with the transport stream selected in the processing step 410. In a processing step 411, the CPU 153 checks whether or not delay times have been calculated with respect to all of the transport streams. If there is a transport stream which has not yet been processed, then the process operation is returned to the previous processing step 409.

The delay times calculated in the processing step 410 in the above-described processing manner are reflected within the buffers as such values for shifting the PCR packet positions in the respective transport streams. The reflections of these delay times are performed with respect to all of the transport streams which should be processed.

Figure 5:
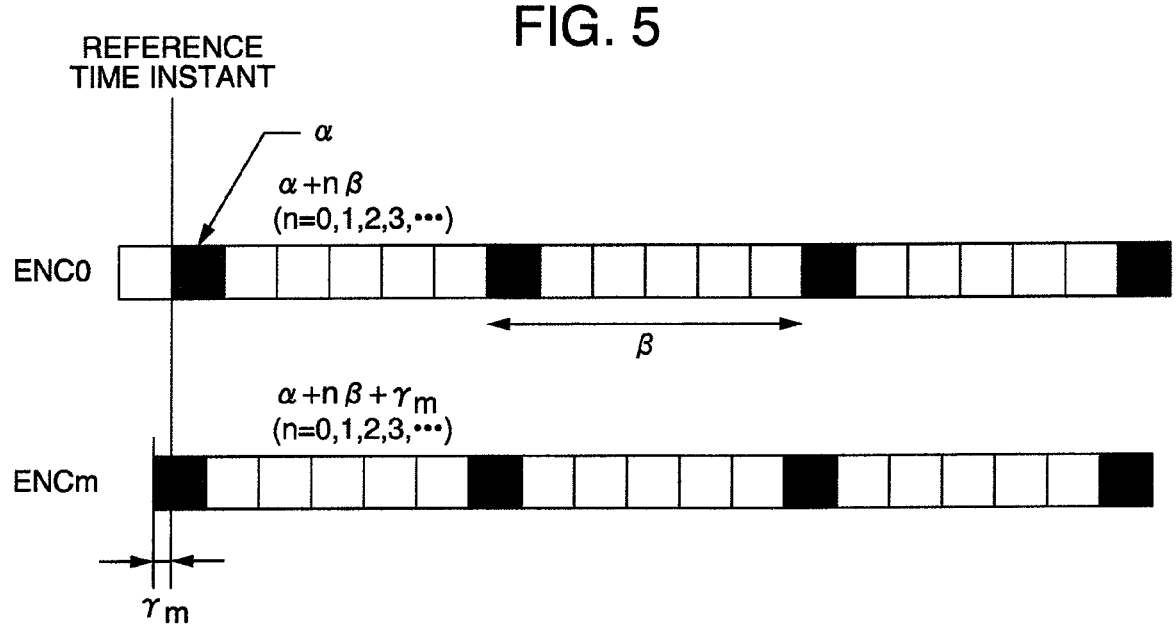
FIG. 5 is an explanatory diagram for explaining correction values of PCR values employed in the digital broadcast multiplexing apparatus.

Next, a description is made of a PCR correction value forming operation of the PCR correction value forming apparatus 108 with reference to FIG. 5. Firstly, an arrival absolute time instant of a PCR packet in the above-described transport stream which is employed as the reference is defined as a reference time instant. Even in such a case that a position of a PCR packet is corrected based upon the process flow indicated in FIG. 4 with respect to a transport stream transmitted from a signal generating apparatus "ENCm", which should be processed, since the PCR correcting process operation is a realtime process operation, it is conceivable that the below-mentioned delay/error may occur. That is, a delay may occur in a process operation executed in a buffer during steps of the PCR correcting process operation, so that an error may be slightly produced at the position of the PCR packet. Accordingly, a first calculation is made of a difference "γm" between the reference time instant defined by the transport stream containing the above-described error, which is employed as the reference, and an actual arrival absolute time instant of such a transport stream that a position of a PCR packet and a value of this PCR packet are tried to be changed. While the calculated time difference "γm" is employed as a correction value, assuming now that a value to a PCR packet of the transport stream which is employed as the reference is "α", an insertion period time of the PCR packet is "β", and a time period is "n(n=0, 1, 2, - - - )", a correction time is given as follows with respect to a PCR value of the signal generating apparatus ENCm:

correction time=α+nβ+γm    (formula 2)

This value is employed in the REMUX apparatus 109 corresponding to a next process operation so as to determine a position of a PCR packet and a value of this PCR packet contained in each of the transport streams.

A description is made of an example as to methods for calculating the above-described difference "γm" in this exemplification. It is conceivable that since transport streams entered from a plurality of signal generating apparatuses are not always synchronized with each other, delays caused by PCR correcting process operations may occur. Accordingly, even when multiplexed positions of PCR packets are matched with each other by the PCR position correcting apparatus 106, PCR values of other transport streams are not always matched with the PCR value of the transport stream which is employed as the reference. As a consequence, after the PCR values of other transport streams are delayed by the delay time calculated from the above-described PCR delay reference time instant, the PCR packet position correcting operation is carried out in such a manner that a packet position of a next transport stream is defined as the multiplexed position of the PCR packet. As a result of this PCR packet position correction, as to the multiplexed positions of the PCR packets of the respective transport streams, which have been matched with respect to the PCR delay reference time instant, multiplexed positions of PCR packets of such transport streams to be corrected are detected, which are present within a range defined between "β/2" and "−β/2" from the arrival absolute time instant of the PCR packet of the transport stream which is employed as the reference. A difference between the arrival absolute time instant corresponding to this PCR packet and the arrival absolute time instant of the reference PCR packet is defined as "γm."

Next, a description is made of process operations for correcting a value of a PCR packet stored in the PCR packet, which is executed by the PCR correction value forming apparatus 108 with employment of the above-calculated time instant difference "γm." The above-described process operations will now be explained with reference to FIG. 6. After the process operation is commenced, similar to the above-explained processing step 401, a transport stream which is employed as the reference is selected in a processing step 601. Thereafter, in a processing step 602, a selection is made of such a transport stream that a process operation for correcting a value stored in a PCR packet is carried out. At this time, since the multiplexed position of the PCR packet has been determined, the value of the PCT packet contained in the transport stream which is employed as the reference is corrected based upon the correction time calculated in the above-described formula 2 (processing step 603). In a next processing step 604, as previously explained, a detection is made of a shift between an arrival time instant of the transport stream which is employed as the reference, and an actual arrival time instant as to a PCR packet contained in a transport stream in which a position of the PCR packet and a PCR value should be corrected, and then, the detected shift is assumed as a correction value "γm." This correction value "γm" is stored in the storage apparatus 152 in correspondence with the transport stream. In a processing step 605, a value of a PCR counter of a transport stream "m" which has been selected as the subject for correcting the PCR is corrected based upon the above-described formula 2. Thereafter, the CPU 153 confirms whether or not all of such transport streams to be corrected have been processed in a processing step 606. In such a case that the transport streams are present which have not yet been processed, the process operation is returned to the previous processing step 602 in which a similar correcting operation is carried out with respect to the next transport stream until the transport streams to be processed disappear.

Figure 6:
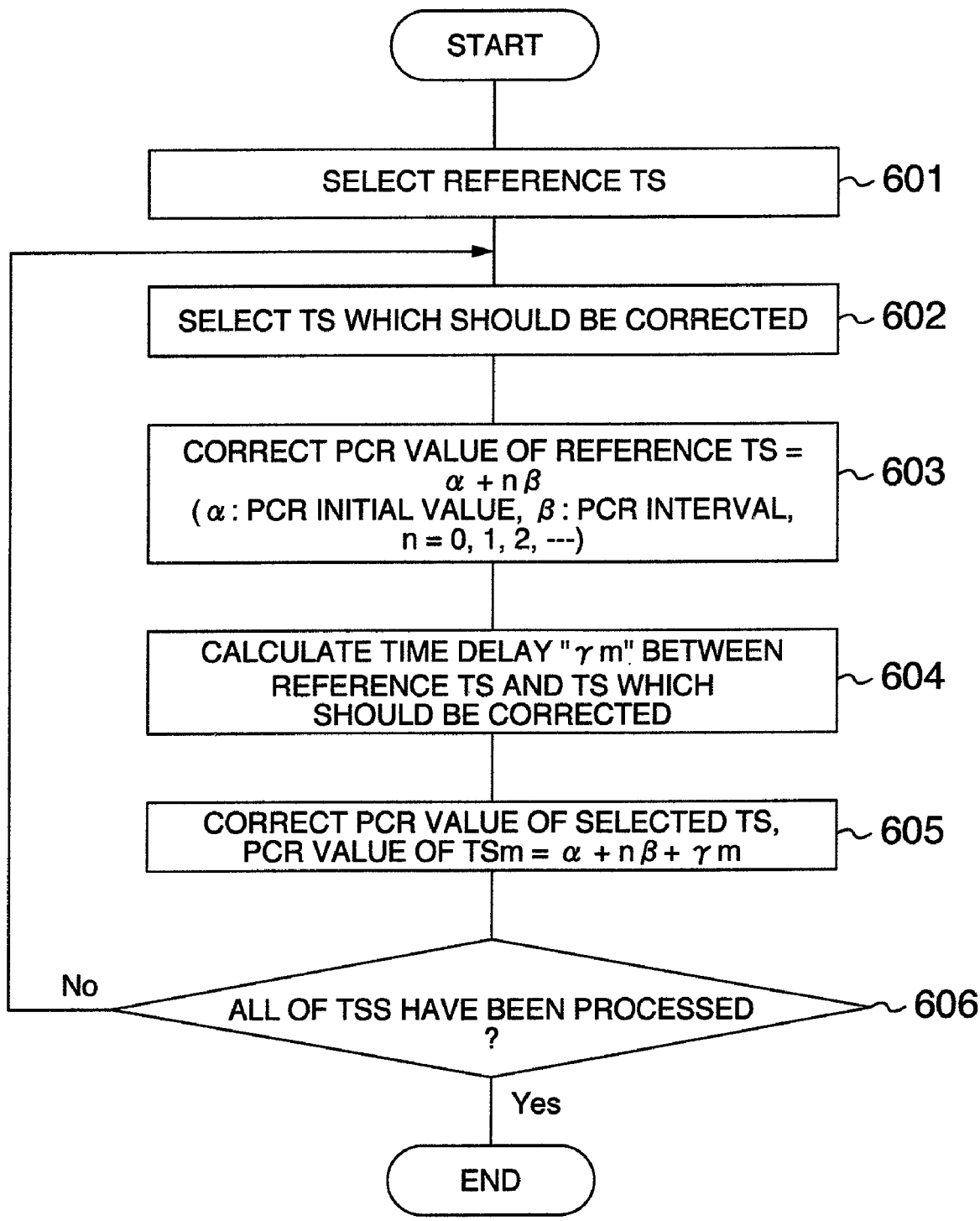
FIG. 6 is a flow chart for describing a correction value calculating process operation for PCR values, executed in the digital broadcast multiplexing apparatus.

Both the above-described process operations shown in FIG. 4 and FIG. 6 are necessarily required to be carried out every time the digital broadcast multiplexing apparatus 150 is initiated, or when the values of the PCR packets are circulated by 1 turn, so that these values are returned to the original values of the PCR packets. Then, if the process performance of the digital broadcast multiplexing apparatus 150 is sufficiently high, then it is preferable that the above-explained process operations are executed every PCR multiplexing time period, or every predetermined time period in view of the processing precision. However, in such a case that the processing performance of the digital broadcast multiplexing apparatus 150 is not so sufficiently high, the digital broadcast multiplexing apparatus 150 may alternatively perform the calculations when the digital broadcast multiplexing apparatus 150 is initiated; both the delay times and the correction value "γm" may be alternatively stored in the storage apparatus 152 in correspondence with the respective transport streams; and thereafter, the digital broadcast multiplexing apparatus 150 may alternatively utilize these values.

Figure 7:
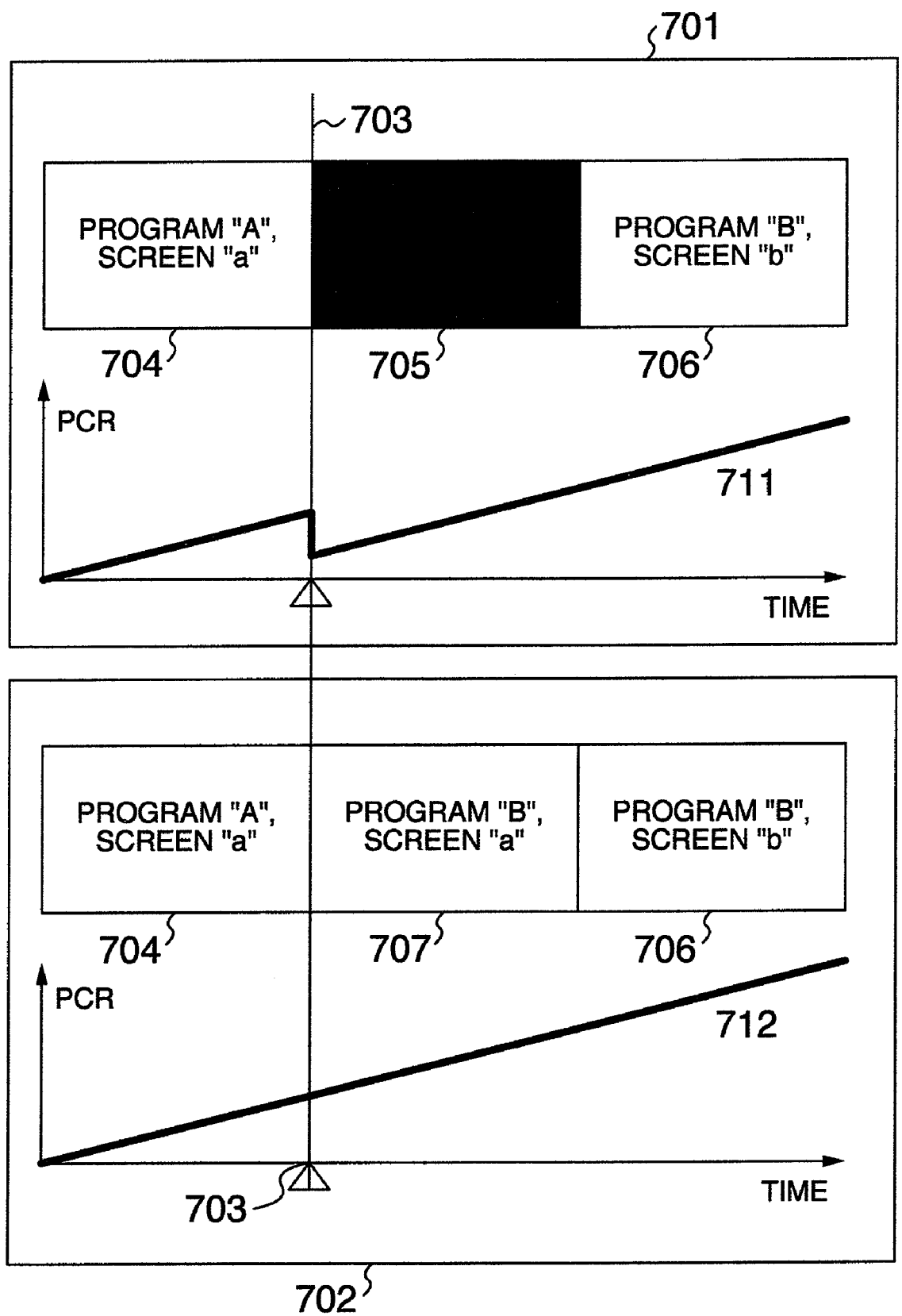
FIG. 7 is an explanatory diagram for explaining transitions of screens which are caused by channel selections in the conventional technique and the digital broadcast multiplexing apparatus.

FIG. 7 represents a transition example of screens. That is, as previously explained, when a plurality of programs are transmitted through a single channel, the method described in the present invention is applied, and black out and freezing phenomena do not occur even in such a case that programs are switched within the single channel.

Reference numeral 701 shown in FIG. 7 represents a screen transition caused by switching the programs in such a case that while a time instant synchronization cannot be established among transport streams of a segment corresponding to each of the programs, PCR values are fluctuated, and further, the transport streams of the respective segments are discontinuities. Also, reference numeral 702 shows display conditions of screens in such a case that the digital broadcast multiplexing apparatus 150 to which the present invention has been applied receives a channel on which transport streams of a plurality of programs have been multiplexed, and then, switches a program "A" to another program "B" within this channel.

It should also be understood that reference numerals 701 and 702 indicate such an example that the program switching operations are carried out at a time instant 703. In these exemplifications, in such a case 701 that the digital broadcast programs are transmitted with employment of the fluctuated PCR values, when the program switching operation is carried out, the PCR values are discontinuities (refer to reference numeral 711). As a result, a screen "a" of a program "A" displayed as reference numeral 704 is brought into a so-called "black out" status displayed as reference numeral 705 for the time being just after the channel is switched. Then, at a time instant when a predetermined amount of data related to a switched program "B" (switching destination) has been stored, as indicated by reference numeral 706, a screen "b" of this program "B" is displayed. On the other hand, when the digital broadcast multiplexing apparatus 150 of the present invention is employed, as represented in a graph 712 located on a lower side of the reference numeral 702, the PCR values are maintained under continues condition without being interrupted. As a consequence, even when the channel switching operation is carried out at the time instant 703, such a screen "a" 707 of the program "B" which was not displayed in the above-described reference numeral 701 is displayed in a continuous mode, resulting in convenient viewing.

The REMUX apparatus 109 corresponds to such an apparatus which re-multiplexes the transport streams generated from the respective signal generating apparatuses 100 to 104, the occurring positions of PCRs of which have been corrected by the PCR position correcting apparatus 106, based upon such a data format in accordance with the format for outputting the re-multiplexed transport stream to the OFDM modulator 110 provided at a post stage of the REMUX apparatus 109. This basic multiplexing system has been standardized as ARIB STD-B31 by Association of Radio Industries and Businesses (ARIB). As described as to the digital broadcast multiplexing apparatus 150 using the present invention, since identification numbers are applied to the transport streams of the respective segments, segment numbers are applied with respect to 4 bits (from B110 to B113) of TMCC information shown in FIG. 8, and thereafter, the transport streams are re-multiplexed in accordance with the specification described in the above-explained standard ARIB STD-B31. At this time, as determined in the operating regulations TR-B14 of Association of Radio Industries and Businesses (ARIB), the PCRs are replaced in combination with the numeral values of the PCRs based upon arrangements of TS packets of multiplexed frame structures when the re-multiplexing operation is carried out in the REMUX apparatus 109 provided at the post stage.

Then, the transport stream which has been re-multiplexed by the REMUX apparatus 109 is modulated based upon the OFDM modulating system in the OFDM modulator 110 so as to be converted into broadcasting waveforms of a digital broadcasting program.

As previously described, since the inventive idea of the present invention is employed, the PCR packets among the respective segments can be synchronized with each other. As a consequence, even when a segment tuned within a channel is moved, occurrence frequencies as to black out and screen freezing phenomena are reduced when the tuning operation is carried out.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A digital broadcast multiplexing apparatus for receiving a plurality of program packet streams so as to multiplex the received plural program packet streams on a single physical channel, comprising:

a PCR detecting apparatus for detecting a position of a PCR (program Clock Reference) packet from said received program packet streams, while said PCR packet is employed as a reference of a time synchronization and is present in said received program packet streams;

a PCR position correcting apparatus for matching positions of PCR packets contained in said plurality of program packet streams, which are detected by said PCR detecting apparatus, with the position of the PCR packet contained in said program packet streams, which is employed as the reference of the time synchronization;

a PCR correction value forming apparatus for calculating correction values with respect to values of the PCR packets contained in the program packet streams except for the program which is employed as the reference of the time synchronization based upon a value of the PCR packet detected by said PCR detecting apparatus; and a re-multiplexing apparatus for outputting a program packet stream in which a plurality of program packets whose PCR packet positions have been changed are multiplexed with the program packet stream which is employed as the reference of the time synchronization on said one physical channel; wherein:

said re-multiplexing apparatus corrects the values of the PCR packets of the program packet streams based upon said correction values, the PCR packet positions of which have been changed.

2. A digital broadcast multiplexing apparatus as claimed in claim 1 wherein: said PCR position correcting apparatus calculates delay times for delaying transmissions of the PCR packets contained in said plurality of program packet streams based upon deviations between the reference position of the PCR packet which is employed as the reference of the time synchronization and is detected by said PCR detecting apparatus and the PCR packet positions of the program packet streams which are synchronized with said reference position so as to match the positions of the PCR packets with the position of said PCR packet contained in the program packet stream, which is employed as the reference.

3. A digital broadcast multiplexing apparatus as claimed in claim 1 wherein: said PCR correction value forming apparatus calculates the correction values for correcting the values of said PCR packets contained in said plurality of program packet streams based upon deviations between the reference position of the PCR packet which is employed as the reference of the time synchronization and is detected by said PCR detecting apparatus and the PCR packet positions of the program packet streams which are synchronized with said reference position.

4. A digital broadcast multiplexing apparatus as claimed in claim 1 wherein:
said PCR position correcting apparatus calculates the PCR packet positions of the respective program packet streams based upon the greatest common divisor as to time periods of the PCR packets contained in the plurality of inputted program packet streams.

* * * * *